Sept. 12, 1939.  J. MORAY  2,172,984

SHEARING CHISEL

Filed Feb. 1, 1938

INVENTOR
JOHN MORAY
BY
ATTORNEY

Patented Sept. 12, 1939

2,172,984

UNITED STATES PATENT OFFICE 2,172,984

SHEARING CHISEL

John Moray, Whitestone, N. Y.

Application February 1, 1938, Serial No. 188,031

3 Claims. (Cl. 30—168)

This invention relates to new and useful improvements in a shearing chisel.

The invention has for an object the construction of a shearing chisel which is capable of cutting sheet metal and plate.

It is proposed to provide a chisel which is capable of being used for many purposes heretofore requiring an acetylene torch. In expense and simplicity of operation there can be no comparison between the chisel and the torch. More than this, quite often an acetylene torch is not available, particularly in periods of emergency, and in such instances the chisel may be used with great satisfaction.

The cost of a chisel constructed according to this invention is approximately 1% of the cost of an acetylene torch and therefore may be purchased by nearly anyone and kept among one's tools and be always available when needed. The chisel does not present the fire hazards of an acetylene torch.

It is proposed to so construct the chisel so that it is very effective where metal shears are too light to be used for a particular job. It is proposed to arrange the chisel so that it cuts clean and leaves no ragged edges. It is also proposed to arrange the chisel so that it may be used in confined places.

Another object of the invention is to construct the chisel in a manner so that it may easily be sharpened on an ordinary grinder.

Still further it is proposed to arrange a tapered portion on the chisel, which prevents the chisel from jamming in the cut so that the chisel frees itself as it cuts.

Still further it is proposed to so arrange the chisel that the material which is cut curls to a shaving arc, in a novel manner.

The shearing chisel may be sold in sets of six sizes: to machine shops, auto repair shops, ship or boat yards, ships, airplane manufacturing companies, mail order houses and to an unlimited number of buyers. The chisel may be used with an ordinary hammer or with an air, electric or similar hammer.

Still further the invention proposes to so arrange the chisel that it may cut in a circle.

Another object is to adapt the chisel to cut in a circle or in a straight line as required.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The shearing chisel, according to this invention, comprises a flat body 10 having a concaved front cutting edge 11 and a shank 12 on the rear portion thereof. The flat body 10 is formed with tapering edges 10$^a$ which continue into the shank 12 and flat sides 10$^c$. From the faces of the flat sides 10$^c$ of the body 10 there are tapering portions 10$^b$ which continue into the sides of the shank 12. The shank 12 is shown to be of polygonal form.

Figure 3:
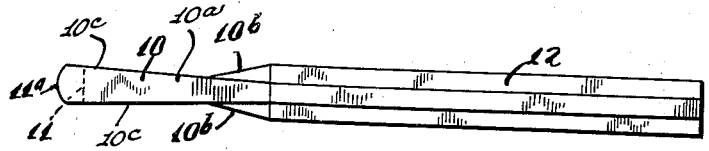
Fig. 3 is a side view of Fig. 2.

The concaved front cutting edge 11 has its end portions 11$^a$ formed round as clearly shown in Fig. 3. This prevents sharp corners which are liable to injure a user. The chisel should be made of tool steel or other tough material.

Figure 1:
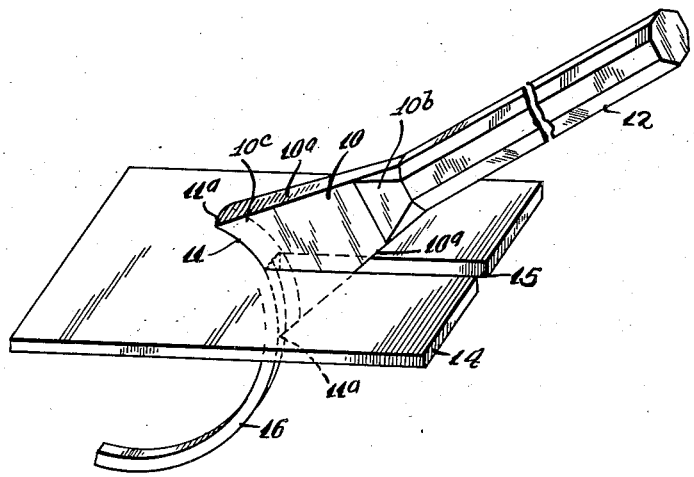
Fig. 1 is a perspective view of a shearing chisel constructed according to this invention and shown cutting a sheet of metal.
Figure 2:
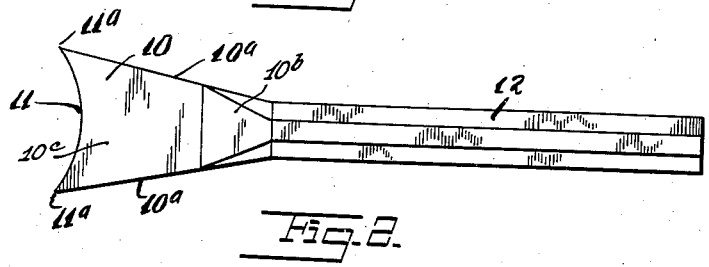
Fig. 2 is an elevational view of the chisel.

Fig. 1 illustrates the chisel in actual use. A plate 14 is illustrated which has been formed with a cut 15 by the chisel. The shaving 16 from the cut is also illustrated. It is necessary that the cut 15 be first started before the chisel is used. It may be started with a cutting tool or other implement. Once the cut is started the chisel is hammered along and continues the cut. The shaving 16 is continuous in form and is caused to turn around and around due to the curvature of the concaved front cutting edge 11. The shaving may be of any length depending merely upon the length of the plate 14 being cut.

Figure 5:
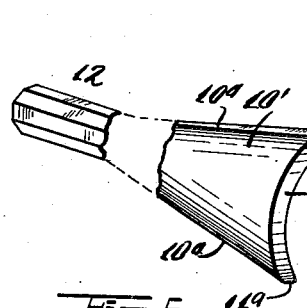
Fig. 5 is a perspective view of a chisel constructed according to a modification of the invention.
Figure 4:
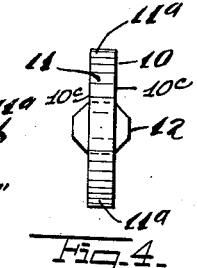
Fig. 4 is an end elevational view of Fig. 2.

In Fig. 5 a modification of the invention has been disclosed in which a shearing chisel is illustrated having a laterally curved body 10'. The front edge of this body is formed with a concaved cutting side 11'. The body is connected with a handle 12. In other respects this form of the invention is similar to the previous form and similar parts may be recognized by corresponding reference numerals.

Because of the lateral curvature of the body 10' when the chisel is used it may easily be guided along a curved surface and cut a curved cut instead of a straight cut.

Figure 6:
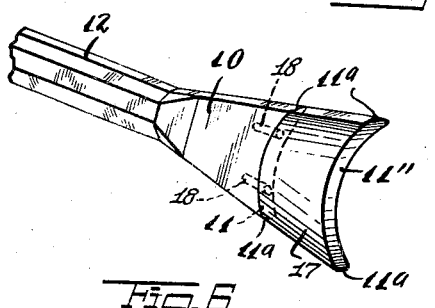
Fig. 6 is a fragmentary perspective view of another modification of the invention.

In Fig. 6 another embodiment of the invention has been disclosed which is very similar to the form shown in Figs. 1–4 except that there is an auxiliary front member 17 which serves to convert the flat body into a curved body. This auxiliary front member has a front concaved cutting edge 11''. The front end of the body 10 has the concaved cutting edge 11. The rear end of the auxiliary front member 17 has a curved shape adapted to fit into the curvature of the end 11. Several holding pegs 18 project from the rear end of the auxiliary front member 17 and engage into receiving socket openings in the front end portion of the edge 11 for detachably holding the auxiliary front member in position. The auxiliary front member 17 becomes flatter towards its rear end so as to be alignable with the front end of the body 10.

When desired the chisel is used with the auxiliary front member in position. It may then be used to cut curves. A plurality of differently curved auxiliary front members similar to the member 17 may be supplied with the chisel to be substituted for one another to cut curvatures of different sizes. When desired the auxiliary front member 17 may be completely removed and then the frame body 10 is exposed for use and the front cutting edge 11 thereof may be used for straight cuts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A shearing chisel comprising a flat body having a concaved front cutting edge, a shank on the rear portion of said body, and an auxiliary front member curved laterally of its length at the front and gradually becoming flat at the rear and having a concaved front cutting edge and a convexed rear edge, the rear edge fitting the concaved front edge of said body, and fastening elements for securely and releasably holding said auxiliary front member on said flat body.

2. A shearing chisel comprising a flat body having a concaved front cutting edge, a shank on the rear portion of said body, and an auxiliary front member curved laterally of its length at the front and gradually becoming flat at the rear and having a concaved front cutting edge and a convexed rear edge, the rear edge fitting the concaved front edge of said body, and fastening elements for securely and releasably holding said auxiliary front member on said flat body, said fastening elements, comprising socket openings formed in one of the parts, and studs formed on the other of the parts and engageable into said socket openings.

3. A shearing chisel comprising a flat body having a concaved front cutting edge, a shank on the rear portion of said body, and an auxiliary front member curved laterally of its length at the front and gradually becoming flat at the rear and having a concaved front cutting edge and a convexed rear edge, the rear edge fitting the concaved front edge of said body, and fastening elements for securely and releasably holding said auxiliary front member on said flat body, said fastening elements, comprising socket openings formed in one of the parts, and studs formed on the other of the parts and engageable into said socket openings, said studs and sockets being arranged upon the contacting edge portions of said member and body.

JOHN MORAY.